(12) United States Patent
Morken

(10) Patent No.: US 8,475,932 B2
(45) Date of Patent: Jul. 2, 2013

(54) COMPOSITIONS OF ORGANIC ACID MODIFIED IONOMERS FILLED WITH SILICA

(75) Inventor: Peter A. Morken, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 286 days.

(21) Appl. No.: 12/902,274

(22) Filed: Oct. 12, 2010

(65) Prior Publication Data

US 2012/0088602 A1    Apr. 12, 2012

(51) Int. Cl.
*C08L 33/02*    (2006.01)
*C08K 7/10*    (2006.01)
*C08K 5/09*    (2006.01)

(52) U.S. Cl.
USPC ........... 428/522; 428/500; 524/322; 524/394; 524/397; 524/400; 524/492; 524/493; 473/373; 473/385; 473/349; 36/69; 36/77 M; 36/25 R

(58) Field of Classification Search
None
See application file for complete search history.

(56) References Cited

U.S. PATENT DOCUMENTS

| | | | |
|---|---|---|---|
| 3,264,272 A | 8/1966 | Rees | |
| 5,306,760 A * | 4/1994 | Sullivan | 473/385 |
| 6,565,456 B2 | 5/2003 | Hayashi et al. | |
| 6,653,382 B1 | 11/2003 | Statz et al. | |
| 6,777,472 B1 | 8/2004 | Statz et al. | |
| 6,815,489 B1 | 11/2004 | Fischer et al. | |
| 6,953,820 B2 | 10/2005 | Statz et al. | |
| 7,156,755 B2 | 1/2007 | Kennedy, III et al. | |
| 7,361,101 B2 | 4/2008 | Kennedy, III et al. | |
| 7,375,151 B2 | 5/2008 | Statz et al. | |
| 2002/0111407 A1 | 8/2002 | Takesue et al. | |
| 2003/0114565 A1* | 6/2003 | Chen et al. | 524/322 |
| 2004/0076846 A1* | 4/2004 | Domine et al. | 428/515 |
| 2005/0267240 A1 | 12/2005 | Chen | |
| 2007/0203277 A1 | 8/2007 | Chen | |
| 2008/0312007 A1* | 12/2008 | Rajagopalan et al. | 473/367 |
| 2009/0118040 A1 | 5/2009 | De Garavilla | |
| 2009/0325733 A1 | 12/2009 | Morken et al. | |

FOREIGN PATENT DOCUMENTS

EP    1124898 B1    12/2004

OTHER PUBLICATIONS

Dannenberg, Filler Choices in the Rubber Industry; Rubber Chemistry and Technology vol. 55 No. 3 Jul. 1982; pp. 860-880.*

* cited by examiner

*Primary Examiner* — David Buttner

(57) ABSTRACT

Disclosed is a composition comprising, or produced from, an organic acid-modified ionomer and silica filler having oil absorption greater than 100 g oil/100 g silica. Also disclosed are articles produced from the composition such as golf balls.

20 Claims, 1 Drawing Sheet

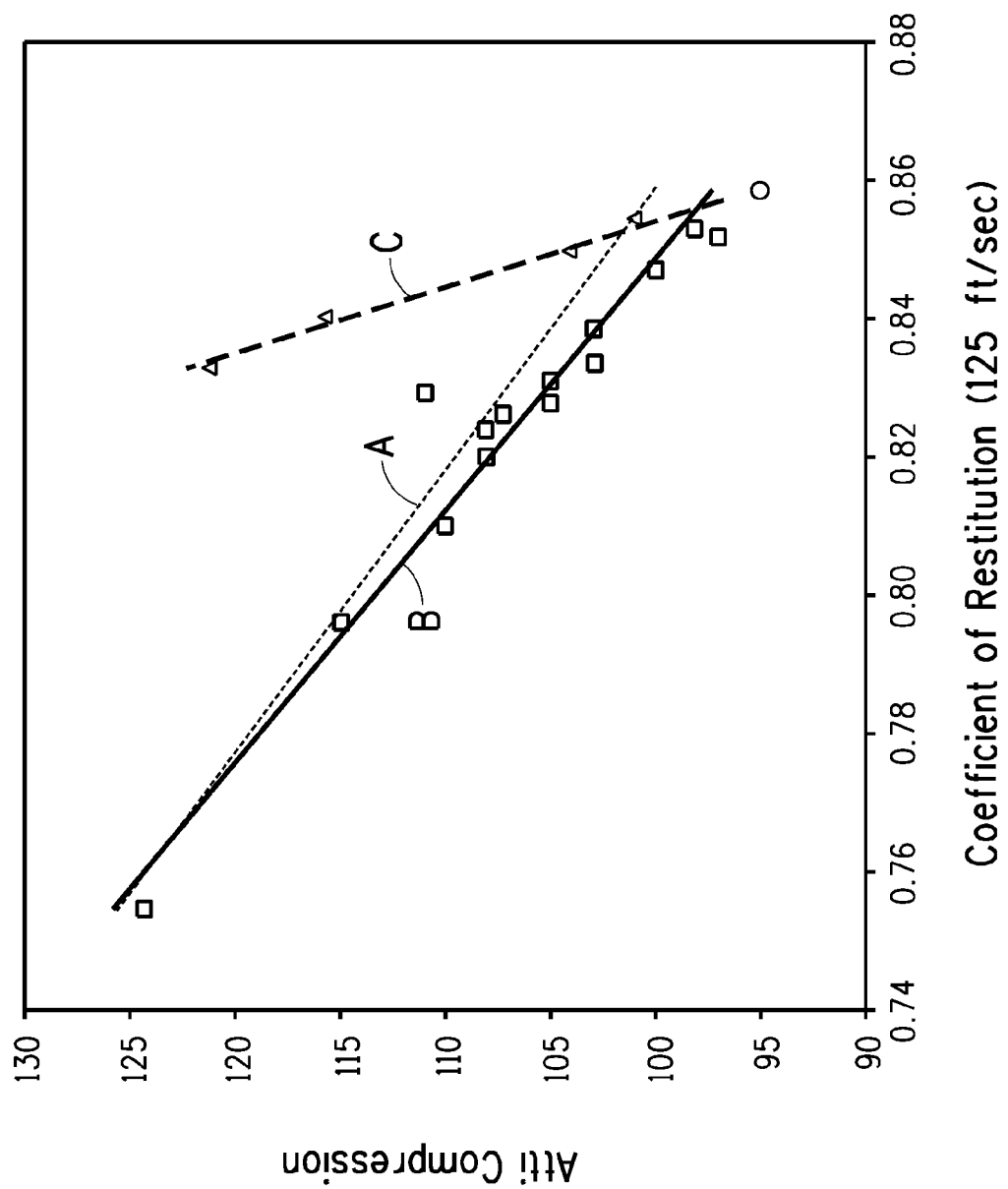

COMPOSITIONS OF ORGANIC ACID MODIFIED IONOMERS FILLED WITH SILICA

The invention relates to filled compositions of organic acid modified ionomers useful for preparing golf balls.

BACKGROUND OF THE INVENTION

Several patents and publications are cited in this description in order to more fully describe the state of the art to which this invention pertains. The entire disclosure of each of these patents and publications is incorporated by reference herein.

Premium golf balls include wound balls, two-piece balls and multilayered balls. Wound balls may have a spherical molded center, elastomeric thread-like material wound around the center, and either a thermoplastic or thermoset cover. Two-piece balls have a spherical molded core covered with a thin layer of thermoplastic or thermoset material. Multilayered balls have a spherical molded core, a cover, and one or more intermediate layers between the core and the cover.

Thermoplastic ionomers of copolymers of α-olefins, particularly ethylene, and $C_{3-8}$ α,β-ethylenically unsaturated carboxylic acids have found utility in golf ball components such as covers, and other applications. See, e.g., U.S. Pat. No. 3,264,272.

Ionomers have also been modified with fatty acids. For example, U.S. Pat. No. 6,777,472 discloses a melt-processable thermoplastic composition consisting essentially of (a) from 20 to 45% aliphatic, mono-functional organic acid(s) having fewer than 36 carbon atoms or salt(s) thereof; and (b) ethylene, $C_3$ to $C_8$ α,β-ethylenically unsaturated carboxylic acid copolymer(s) or melt-processible ionomer(s) thereof, wherein greater than 90% of all the acid of (a) and (b) is neutralized by concurrently or subsequently adding to the melt blend of (a) and (b) an amount of a cation source necessary to obtain greater than 90% neutralization.

Modified ionomers have been used as golf ball components. For example, U.S. Pat. No. 6,565,456 discloses multilayer golf balls comprising a solid core, a surrounding layer, an intermediate layer and a cover, wherein at least one of the surrounding layer, the intermediate layer or the cover is formed of a heated mixture comprising (a) an olefin-carboxylic acid-optional carboxylate random copolymer and/or (d) a metal ion-neutralized olefin-carboxylic acid-optional carboxylate random copolymer; (b) a fatty acid or derivative; and (c) a neutralizing basic inorganic metal compound.

U.S. Pat. No. 6,653,382 discloses golf balls comprising a thermoplastic polymer consisting essentially of at least one of (a) E/X/Y copolymers where E is ethylene, X is a $C_{3-8}$ α,β-ethylenically unsaturated carboxylic acid, and Y is a softening comonomer of the E/X/Y copolymers, wherein X is about 3-30% of the E/X/Y copolymer, or partially neutralized ionomers thereof, and Y is about 0-30% of the E/X/Y copolymer; and (b) one or more aliphatic, mono-functional organic acids having fewer than 36 carbon atoms or salts thereof being present in the range of about 25 to about 150 parts per hundred parts by weight of the E/X/Y copolymer, wherein greater than 90% of all the acid of (a) and of (b) is neutralized with a cation source.

US2002/0111407 discloses golf balls comprising a base resin comprising a (metal ion-neutralized) olefin-unsaturated carboxylic acid-unsaturated carboxylate ternary random copolymer and optionally a (metal ion-neutralized) olefin-unsaturated carboxylic acid binary random copolymer blended with specific proportions of a fatty acid and/or fatty acid derivative and a basic inorganic metal compound capable of neutralizing acidic groups left unneutralized in the base resin and fatty acid.

U.S. Pat. No. 6,953,820 discloses a composition, and golf balls comprising the composition, comprising a thermoplastic polymer blend which has a coefficient of restitution of at least 0.785 and an Atti compression of no more than 100, wherein the blend consists essentially of at least one (a) E/X/Y copolymers where E is ethylene, X is a mixture of at least two $C_3$ to $C_8$ α,β-ethylenically unsaturated carboxylic acids, and Y is a softening comonomer or ionomers of the E/X/Y copolymers wherein X is about 3-30% of the E/X/Y copolymer, and Y is 0 to about 30% of the E/X/Y copolymer; and (b) one or more aliphatic, mono-functional organic acids having fewer than 36 carbon atoms or salts thereof, wherein greater than 90% of all the acid of (a) and of (b) is neutralized.

See also U.S. Pat. Nos. 6,815,489. 7,375,151, US2005/0267240, US2007/0203277, US2009/0118040, and EP1124898B1 (organic acid-modified ionomer compositions and their use in golf balls because of their high resilience, but their stiffness may be too low for certain golf ball constructions).

Thermoplastic compositions such as those described above have been modified with various inorganic fillers to reduce cost, to affect rheological, mixing and physical properties such as density, flex modulus, hardness (e.g. Shore D), mold release, melt flow index and the like, and/or reinforce the material. For example, the compositions have been modified by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof. For example, see U.S. Pat. Nos. 7,156,755 and 7,361,101.

Fillers have also been used to modify the density of the compositions to adjust the weight of the golf ball to meet required limits, by imparting additional density to the compositions. The amount of filler employed is primarily a function of weight requirements and desired weight distribution of the golf ball. Filler may be included in one or more layers of the golf ball, such as the core or intermediate layer(s), the selection being dependent upon the type of golf ball desired (i.e., two-piece, wound or multilayer).

In golf balls it is increasingly desirable to use intermediate layers ("mantles" or "inner covers", or "outer cores") that have properties including high resilience, high stiffness, and moisture barrier to enable optimum velocity, spin, feel, and playability. It is also sometimes desirable to move weight from the core to the outer layer(s) of the golf ball.

Thus, it is desirable to prepare compositions suitable for use in a golf ball that provide a combination of such properties.

SUMMARY OF THE INVENTION

The invention provides a filled thermoplastic composition comprising, consisting essentially of, or produced from an organic acid-modified ionomer and a silica filler wherein the organic acid-modified ionomer comprises or is produced from an ethylene acid copolymer and an organic acid or salt thereof;

the ethylene acid copolymer comprises or consists essentially of copolymerized units of ethylene, copolymerized units of a $C_{3-8}$ α,β-ethylenically unsaturated carboxylic acid, and optionally copolymerized units of a softening comonomer selected from the group consisting of vinyl acetate, alkyl acrylate and alkyl methacrylate;

the organic acid comprises, or is preferably, at least one aliphatic, monofunctional organic acid having 4 to 36 carbon atoms;

the combined acid moieties in the acid copolymer and the organic acid are nominally neutralized to a level from about 70% to about 100%; and the silica filler has an oil absorption greater than 100 g oil/100 g silica, as determined according to ASTM D1483-95.

Also provided is an article comprising the filled composition described above, such as a golf ball comprising a core and a cover and, optionally, at least one intermediate layer positioned between the core and the cover, wherein the cover, core or an intermediate layer when present comprises or is prepared from the filled composition.

BRIEF DESCRIPTION OF THE DRAWING

FIG. 1 is a plot of Atti (PGA) compression versus Coefficient of Restitution (125 ft/sec initial velocity) showing the properties of molded spheres of resins of the present invention compared to other resins.

DETAILED DESCRIPTION OF THE INVENTION

The following definitions apply to the terms as used throughout this specification, unless otherwise limited in specific instances. What follows "is" may be considered as definition.

The technical and scientific terms used herein have the meanings that are commonly understood by one of ordinary skill in the art to which this invention belongs. In case of conflict, the present specification, including the definitions herein, controls. Tradenames are in uppercase.

The terms "comprises," "comprising," "includes," "including," "containing," "characterized by," "has," "having", "produced from", or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith.

The transitional phrase "consisting essentially of" limits the scope of a claim to the specified materials or steps and those that do not materially affect the basic and novel characteristic(s) of the claimed invention. Optional additives as defined herein, at levels that are appropriate for such additives, and minor impurities are not excluded from a composition by the term "consisting essentially of".

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that may have become recognized in the art as suitable for a similar purpose.

Unless stated otherwise, all percentages, parts, ratios, and like amounts, are defined by weight.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 18% of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such. "Dipolymer" refers to polymers consisting essentially of two monomers and "terpolymer" refers to polymers consisting essentially of three monomers.

Organic acid-modified ionomer compositions, when mixed with up to 20% of silica with high oil absorption, such as fumed silica or precipitated silica, as a filler exhibit much greater stiffness (as indicated by Atti compression) than expected, compared to the same organic acid-modified ionomer composition mixed with other fillers. In addition, silica with high oil absorption provide filled compositions with much less reduction in resilience (as indicated by coefficient of restitution) than other fillers.

Acid Copolymers

The ethylene acid copolymer components of the composition are preferably "direct" or "random" acid copolymers, in which the polymers are polymerized by adding all monomers simultaneously (as opposed to grafted copolymers in which a comonomer is grafted onto an existing polymer).

They are preferably an a-olefin, particularly ethylene, $\alpha,\beta$-ethylenically unsaturated carboxylic acid, particularly acrylic acid or methacrylic acid, copolymer, optionally containing a third softening monomer. "Softening" means that the polymer is made less crystalline.

The acid copolymer may be described as E/X/Y terpolymers where E represents copolymerized units of ethylene, X represents copolymerized units of a $C_{3-8}$ $\alpha,\beta$-ethylenically unsaturated carboxylic acid, preferably acrylic acid or methacrylic acid, and Y represents copolymerized units of a softening comonomer selected from alkyl acrylate or alkyl methacrylate, wherein the alkyl groups have from 1 to 8 carbon atoms, or vinyl acetate. X is present in an amount of about 2 to about 30 (or about 2 to 25 or about 2 to 20, or about 5 to 25)% of the E/X/Y polymer, and Y is present in from 0 to 45% of the E/X/Y copolymer.

Included are E/X/Y terpolymers in which X represents copolymerized units of acrylic acid and Y represents copolymerized units of an alkyl acrylate and is present in an amount from 3 to 45% of the E/X/Y terpolymer (preferably from a lower limit of 3 or 5 or more preferably 10, to an upper limit of 25, 30 or 45). Suitable terpolymers include without limitation ethylene/acrylic acid/methyl acrylate, ethylene/acrylic acid/ethyl acrylate, ethylene/acrylic acid/n-butyl acrylate, ethylene/acrylic acid/iso-butyl acrylate. Preferred terpolymers include ethylene/acrylic acid/n-butyl acrylate terpolymers.

Also included are E/X/Y terpolymers in which X represents copolymerized units of methacrylic acid and Y represents copolymerized units of an alkyl acrylate and is present in an amount from 3 to 45% of the E/X/Y terpolymer (preferably from a lower limit of 3 or 5 or more preferably 10, to an upper limit of 25, 30 or 45). These terpolymers include without limitation ethylene/methacrylic acid/methyl acrylate, ethylene/methacrylic acid/ethyl acrylate, ethylene/methacrylic acid/n-butyl acrylate, and ethylene/methacrylic acid/iso-butyl acrylate, notably ethylene/methacrylic acid/n-butyl acrylate terpolymers.

Of note are E/X/Y terpolymers, wherein X (e.g. methacrylic acid or acrylic acid) is present in an amount from 5 to 20% of the copolymer and Y (e.g. alkyl acrylate such as butyl acrylate) is present in an amount from 10 to 45% of the copolymer.

Also of note are dipolymers that may be described as E/X dipolymers (wherein Y is 0 weight % of the E/X/Y copolymer), including without limitation, ethylene/acrylic acid dipolymers or ethylene/methacrylic acid dipolymers. Of note are E/X/ dipolymers wherein X is present in an amount of 2 to 12% of the dipolymer, or wherein X is present in an amount of 12 to 25% of the dipolymer.

These E/X/Y copolymers preferably have melt indices (MI) from about 0.1 to about 600, or from about 25 to about 300, or from about 60 to about 250 g/10 min.

Methods of preparing ethylene acid copolymers are known. They may be prepared as described in U.S. Pat. No. 4,351,931. Ethylene acid copolymers also may be prepared in continuous polymerizers by use of "co-solvent technology" as described in U.S. Pat. No. 5,028,674.

Preferred are terpolymers and compositions comprising the terpolymers wherein the copolymerized comonomers of $C_{3-8}$ $\alpha,\beta$ ethylenically unsaturated carboxylic acid are acrylic acid or methacrylic acid and the copolymerized comonomers of $C_{3-8}$ $\alpha,\beta$ ethylenically unsaturated carboxylic acid esters are $C_{1-4}$ alkyl esters of acrylic acid or methacrylic acid. More preferred are ethylene/acrylic acid/alkyl acrylate terpolymers and ethylene/methacrylic acid/alkyl acrylate terpolymers.

Ionomers

Unmodified, melt processible ionomers may be prepared from acid copolymers described above by methods known in the art. By "unmodified", it is meant that the ionomers are not blended with any material that has been added for the purpose of modifying the properties of the unblended ionomer. Ionomers include partially neutralized acid copolymers, particularly copolymers prepared from copolymerization of ethylene and acrylic acid or methacrylic acid. The unmodified ionomers may be neutralized to any level that does not result in an intractable (not melt processible) polymer that does not have useful physical properties. Preferably, about 15 to about 90%, more preferably about 50 to about 75% of the acid moieties of the acid copolymer are neutralized to form carboxylate groups. Preferred cations for the carboxylate groups include alkali metal cations, alkaline earth metal cations, transition metal cations, and combinations of two or more of these metal cations.

Cations useful in making the unmodified ionomers include lithium, sodium, potassium, magnesium, aluminum, calcium, barium, or zinc, or combinations of such cations. Magnesium cations or calcium cations are preferred.

Organic Acids and Salts

Suitable organic acids include, without limitation, aliphatic, monofunctional organic acids having 4 to 36 carbon atoms, optionally substituted with from one to three substituents independently selected from $C_{1-8}$ alkyl groups. The organic acids may be saturated or unsaturated, and, if unsaturated, may include more than one carbon-carbon double bond. The term "monofunctional" refers to acids with one carboxylic acid moiety. The suitable organic acids include $C_{4-36}$ (for example $C_{18}$), or $C_{6-26}$, or $C_{6-12}$, or $C_{16-24}$ acids.

Examples of suitable organic acids include, but are not limited to, caproic acid, caprylic acid, capric acid, lauric acid, stearic acid, isostearic acid, behenic acid, erucic acid, oleic acid, iso-oleic acid, and linoleic acid. Naturally derived organic fatty acids such as palmitic, stearic, oleic, erucic, behenic acids, and mixtures thereof may also be employed.

As known in the art, commercial grades of organic acids may include a number of structurally different organic acids of varying lesser amounts. As used herein, unless otherwise specified in limited circumstances, a composition that comprises a named acid may also include other acids that are present in commercial grades of the named acid, at levels that are proportional to their levels in the commercial grade. Furthermore, when the transitional term "consisting essentially of" is applied to compositions that comprise a named acid, other acids that are present in commercial grades of the named acid, at levels that are proportional to their levels in the commercial grade, are not excluded from the composition.

Saturated acids of particular note include stearic acid and behenic acid. Saturated linear organic acids (for example stearic acid and behenic acid) are acids comprising only one $CH_3$ (methyl) and no CH (methenyl) moieties.

Unsaturated linear organic acids (for example oleic acid and erucic acid) are acids that have only one $CH_3$ moiety and at least one carbon-carbon double bond. They include any number of $CH_2$ (methylene) groups, within the carbon count limits set forth above. Monounsaturated acids contain one carbon-carbon double bond. Of note are linear, unsaturated (including multi-unsaturated) organic acids having from 16 to 24 carbon atoms, including but not limited to oleic acid, erucic acid and linoleic acid. Naturally derived organic fatty acids such as (notably) oleic acid, and mixtures thereof, may be used. Oleic acid is commercially available under tradenames INDUSTRENE 106 or INDUSTRENE 206 (PMC Biogenix of Middlebury, Conn.) or PRIOLENE 6900 or PRIOLENE 6910 (Croda Uniqema of New Castle, Del.).

Acids wherein the longest carbon chain of the acid is substituted with from one to three $C_{1-8}$ alkyl substituents, preferably methyl groups, are referred to herein as branched acids. Saturated, branched organic acids are acids comprising at least one CH (methenyl) moiety and at least two $CH_3$ (methyl) moieties. Of note are saturated, branched organic acids wherein the longest carbon chain of the acid is substituted with one $C_{1-8}$ alkyl group. Also of note is a saturated, branched organic acid, preferably having from 6 to 24 carbon atoms, such as the $C_{18}$ saturated branched organic acid, "isostearic acid," also known as isooctadecanoic acid or 16-methyl-heptadecanoic acid.

Unsaturated branched acids are acids comprising at least one carbon-carbon double bond, at least two $CH_3$ moieties and at least one CH moiety. They may include any number of $CH_2$ groups, within the carbon atom limits set forth above. Of note are unsaturated, branched organic acids wherein the longest carbon chain of the acid is substituted with one $C_{1-8}$ alkyl group. Also of note is an unsaturated, branched organic acid, preferably having from 6 to 24 carbon atoms, such as the $C_{18}$ monounsaturated methyl-branched organic acid known as "iso-oleic acid."

While it may be useful for the organic acids (and salts) to have a low volatility when being melt-blended with the acid copolymer or ionomer, volatility has been found to not be limiting when preparing blends with high nominal neutralization levels, particularly above 90%, such as 100%. At 100% nominal neutralization (i.e., sufficient basic compound is added such that all acid moieties in the copolymer and organic acid are nominally neutralized), or when the use of an excess of neutralizing agent results in a nominal neutralization level that is even greater than 100%, the volatility of these components is not significant. Accordingly, organic acids with lower molecular weights, such as $C_4$ and $C_6$ acids, may be used. It is preferred, however, that the organic acid (or salt) be non-volatile and non-migratory. By non-volatile, it is meant that they do not evaporate or sublime significantly at temperatures of melt blending of the acid with the acid copolymer. By non-migratory, it is meant that the acid does not bloom to the surface of the polymeric article under normal storage conditions at ambient temperatures.

Preferably the organic acids are present in about 5% to about 60%, and more preferably, from about 30 to about 50% or from about 35 to about 46% of the total weight of ionomer and organic acid salt, based on the amount of organic acid added to the composition in its non-neutralized or free-acid form.

The cations of the organic acid salts may be any of a wide variety, including the lithium, sodium, zinc, potassium, barium, bismuth, strontium, magnesium, aluminum or calcium salts of the organic acids. Magnesium salts or calcium salts are preferred.

Process for Making the Ionomer Composition

The melt-processable, modified ionomer blends may be produced by heating a mixture of the carboxylic acid copolymer(s) or ionomer(s), the organic acid(s) or salt(s) thereof, and at least one basic compound capable of neutralizing the combined acid moieties of the acid copolymer and the organic acid. For example, the components of the composition may be mixed by (a) Melt-blending ethylene α,β-ethylenically unsaturated $C_{3-8}$ carboxylic acid copolymer(s) or ionomer(s) thereof as described above that are not neutralized to a level that renders them intractable (not melt-processable) with one or more organic acids as described above or salts thereof, and concurrently or subsequently (b) Adding an amount of a basic compound capable of neutralization of the acid moieties in the acid copolymer and in the organic acid that is sufficient to achieve nominal neutralization levels of greater than 70%, greater than 80%, greater than 90%, or about 100%, or above, to provide carboxylate salts comprising an alkali metal cation, alkaline earth metal cation, transition metal cation, or combinations of two or more of these metal cations.

This procedure need not employ an inert diluent such as a solvent. Treatment of acid copolymers and organic acids with basic compounds in this way enables the compositions described herein to be neutralized to a level higher than that which would result in loss of melt processability and properties for the ionomer alone. For example, an acid copolymer blended with organic acid(s) may be nominally neutralized to a level of about 100% or higher without losing melt processability.

The acid copolymer(s) or unmodified, melt-processable ionomer(s) may be melt-blended with the organic acid(s) or salt(s) and other polymers in any manner known in the art. For example, a salt and pepper blend of the components may be made and then melt-blended in an extruder. The melt-processable, acid copolymer/organic-acid-or-salt blend may be treated with the basic compound by methods known in the art, such as melt-mixing. For example, a Werner & Pfleiderer twin-screw extruder may be used to mix the acid copolymer and the organic acid and treat with the basic compound at the same time. It is desirable that the mixing be conducted so that the components are intimately mixed, allowing the basic compound to neutralize the acidic moieties.

The amount of basic metal compound capable of neutralizing acidic groups in the acid copolymer and the organic acid(s) may be determined by adding the stoichiometric amount of the basic compound calculated to neutralize a target amount of acid moieties in the acid copolymer and organic acid(s) in the blend (herein referred to as "% nominal neutralization" or "nominally neutralized"). Thus, sufficient basic compound is made available in the blend so that, in aggregate, the indicated level of nominal neutralization could be achieved.

Suitable basic compounds include compounds of alkali metals, such as lithium, sodium or potassium, transition metal ions and/or alkaline earth metal and mixtures or combinations of such cations. They include formates, acetates, nitrates, hydrogen carbonates, carbonates, oxides, hydroxides or alkoxides of the ions of alkali metals, and formates, acetates, nitrates, oxides, hydroxides or alkoxides of the ions of alkaline earth metals and transition metals. Basic compounds with magnesium or calcium ions, such as the corresponding formate, acetate, hydroxide, oxide, alkoxide, etc.; including magnesium hydroxide, are of note.

It is desirable to run the blending/neutralization process with an extruder equipped with a vacuum port to remove any excess volatiles including moisture. Moisture may have a negative impact on subsequent molding operations in that excess moisture and volatiles may create unwanted foaming and voids in the molded article.

Of note is the composition wherein the overall salt of the composition ("overall salt" is a number of moles that is equal to the total number of moles of carboxylate anions) comprises at least about 75 equivalent % magnesium cations or calcium cations. While other cations may be present, the equivalent percentage of magnesium salts or calcium salts in the final blended ionomeric composition is preferably at least about 75 equivalent %, more preferably at least about 80 equivalent %, and most preferably at least about 90 equivalent % based on the total salt present in the blended composition.

The basic compound(s) may be added neat to the acid copolymer or ionomer thereof and the organic acid or salt thereof. The basic compound(s) may also be premixed with a polymeric material such as an acid copolymer, to form a "masterbatch" that may be added to the acid copolymer or ionomer thereof and the organic acid or salt thereof. A notable masterbatch comprises about 40 to 60% of a copolymer of ethylene, acrylic acid or methacrylic acid, and optionally an alkyl acrylate wherein the alkyl group has from 1 to 4 carbon atoms; and about 40 to 60% of a basic compound as described above (e.g., $Mg(OH)_2$). Of note are compositions comprising or prepared from a thermoplastic composition comprising (a) about 60 to about 70%, based on the combined weight of (a) and (b), of an ethylene acid terpolymer comprising copolymerized units of ethylene, from 5 to 25% of copolymerized units of acrylic acid or methacrylic acid based on the total weight of the ethylene acid copolymer and from 5 to 30% of copolymerized units of an alkyl acrylate wherein the alkyl group has from 1 to 4 carbon atoms (such as butyl acrylate) based on the total weight of the ethylene acid copolymer;

(b) about 30 to about 40% of at least one aliphatic, organic acid having from 16 to 22 carbon atoms, based on the combined weight of (a) and (b); wherein the combined acid moieties of (a) and (b) are nominally neutralized to a level from about 90% to about 100%.

Filler

The filler comprises silica. Silica is a common name for silicon doxide.

Silica is available in several forms including crystal, glass, fibrous, gel, aerogel, fumed silica (or pyrogenic silica), and colloidal silica (e.g. Aerosil).

Because of the large variety of available forms, the physical properties of silica, including density, bulk density, particle size, particle surface area and pore size, can vary significantly. This variability in the physical properties of the silica used as filler can be used to influence the physical properties of the resulting filled composition.

$SiO_2$ has a number of distinct crystalline forms. In most crystalline silicates, the Si atom shows tetrahedral coordination, with 4 oxygen atoms surrounding a central Si atom. Most of the crystalline forms involve tetrahedral $SiO_4$ units linked together by shared vertices in different arrangements. The most common example is seen in the quartz crystalline form of silica $SiO_2$. In each of the most thermodynamically stable crystalline forms of silica, on average, only 2 out of 4 of each the vertices (or oxygen atoms) of the $SiO_4$ tetrahedra are shared with others, yielding the net chemical formula, $SiO_2$. Crystalline silica forms may have densities ranging from about 2.25 $g/cm^3$ to 2.65 $g/cm^3$.

Silica also is available in several amorphous forms. When silicon dioxide $SiO_2$ is cooled rapidly enough, it does not crystallize but solidifies as a glass, or vitreous silica. The glass transition temperature of pure $SiO_2$ is about 1600 K. Fused silica is produced using high purity silica sand as the feedstock, and is normally melted using an electric furnace, resulting in a material that is translucent or opaque, due to very small air bubbles trapped within the material. The density of transparent vitreous silica is about 2.20 $g/cm^3$. Translucent and opaque glasses have lower densities (as low as about 2.0 $g/cm^3$) owing to the entrapped bubbles. Synthetic fused silica is made from a silicon-rich chemical precursor usually using a continuous flame hydrolysis process which involves chemical gasification of silicon, oxidation of this gas to silicon dioxide, and thermal fusion of the resulting dust.

Amorphous forms of silica also include precipitated silica, prepared by acid treatment of alkali silicate solutions, preferably sodium silicate, which causes silicon dioxide to precipitate from solution. Manufacturing process conditions such as concentrations of reactants, rates of addition, fraction of theoretical silicate in the mixture, and temperature determine the characteristic properties of the precipitated silica. A variety of precipitated silicas which vary in key attributes such as for example particle size, surface area, pH, soluble salt content, nature of agglomeration, oil number, or water content are commercially available, such as under the tradenames Flo-Gard™ and Hi-Sil™ from PPG Industries, Inc. and Zeosil® from Rhodia. Precipitated silica generally has oil absorption values of about 60 to 320 g/100 g and surface area from about 25 to about 700 $m^2/g$. Precipitated silica is a preferred filler.

Silica gel is also produced by the acidification of solutions of sodium silicate, but treated in a way to produce a gelatinous precipitate that is then washed and then dehydrated to produce colorless microporous silica. If the product is dried only enough to remove excess surface water, the product is a hydrogel. If the washed gel is further dried, xerogels are obtained. Milling may accompany drying to achieve a desired particle size distribution. The drying of hydrogels and xerogels usually causes a partial collapse of the silica gels structure and a loss of pore volume and porosity. Aerogels, like xerogels, are dry gels, but they are made in such a way as to prevent pore collapse upon drying. Silica gel generally has oil absorption values of 60-200 g/100 g and surface area from about 200 to 800 $m^2/g$ or higher.

A preferred filler is silica such as fumed silica, also known as pyrogenic silica, which is a non-crystalline, fine-grain, low density and high surface area silica. Fumed silica is not to be confused with silica fume, also known as microsilica.

Fumed silica is made from flame pyrolysis of silicon tetrachloride or from quartz sand vaporized in a 3000° C. electric arc. Major global producers are Evonik, Cabot (under the CAB-O-SIL® tradename) and Wacker Chemie Dow Corning.

The physical-chemical properties, e.g., surface area, particle size distribution and structure, of the fumed silica can be controlled through variation of the concentration of the reactants, the flame temperature and reaction time. The primary particle size may be about 5 to 50 nm, but primary particles can form aggregates. CAB-O-SIL® EH-5 TDS is reported to have average particle (aggregate) length of 0.2-0.3 microns. The particles are non-porous and may have a surface of about 50 to 600 $m^2/g$ and specific gravity of about 2.2 $g/cm^3$. Fumed silica generally has oil absorption values of 100-350 g oil/100 g silica.

In these compositions, the silica filler will exhibit a high oil absorption value, as measured by ASTM International Designation D1483-95, of greater than 100 grams of oil per 100 grams of silica, preferably greater than 200, and more preferably greater than 250, such as 100 to 500 g oil/g silica, 200 to 400 g oil/g silica, or 250 to 400 g oil/g silica. In the current standard (reapproved 2007), linseed oil is used as the oil. Other oils that have been used include dibutyl phthalate (DBP), dioctyl phthalate or paraffin oil. This test measures the volume of oil absorbed into a weighed amount of test powder by a gentle stirring and folding and then calculating the mass of oil absorbed into the silica by multiplying by the density of the oil. Correlation between different oils may be possible by comparison of the density of the oils.

A related test, ASTM D281, is conducted similarly, except the mixing of the oil and the powder is more vigorous, using a "spatula rub-out" procedure. The oil absorption values obtained using D-281 tend to be lower than those obtained in the D-1483 test method.

The silica used as a filler may have surface area from 5 to 800 $m^2/g$, preferably having a surface area greater than 100 $m^2/g$, such as 100 to 800 $m^2/g$, 100 to 600 $m^2/g$, or 100 to 400 $m^2/g$. Surface area can be determined using ASTM D1993-03 (reapproved 2008). This test measures the surface area of precipitated hydrated silicas by the conventional Brunauer, Emmett, and Teller (BET) theory of multilayer gas adsorption behavior using multipoint determinations.

The silica filler may be present in the composition in an amount from about 1% to about 20%, preferably from 3% to 17%, or from 5% to 15% or from 3% to 10% or from 5% to 10%, based on the total weight of (a), (b) and (c).

Preferred silica types include fumed silica, precipitated silica or silica gel having oil absorption values and surface area in the ranges described above. Fumed silica and precipitated silica are more preferred.

Examples of previous fillers include metals such as titanium, tungsten, aluminum, bismuth, nickel, molybdenum, iron, steel, lead, copper, brass, boron, boron carbide whiskers, bronze, cobalt, beryllium, zinc, tin, metal oxides including zinc oxide, iron oxide, aluminum oxide, tin oxide, titanium oxide, magnesium oxide, zinc oxide and zirconium oxide, as well as other well known corresponding salts and oxides thereof. Other commonly used fillers include barium sulfate, lead silicate, tungsten carbide, limestone (ground calcium/magnesium carbonate), zinc sulfate, calcium carbonate, zinc carbonate, barium carbonate, clay, tungsten, and mixtures of any of these.

When previous fillers have been used in a particular composition, the coefficient of restitution (COR), as described below, decreased roughly proportionally to the volumetric displacement of the polymer by the filler. For example, if 5 volume % of filler is used to provide a desired specific gravity, then the COR of a sphere made from a filled composition may be about 95% of the COR of a comparable sphere made from the unfilled composition.

When silica having oil absorption greater than 100 g oil/g silica was used as the filler, the reduction in COR was much less compared to most other fillers, and the increase in compression was greater compared to most other fillers. Compositions filled with fumed or precipitated silica with this property provided a unique combination of increased compression while better maintaining COR compared to other fillers.

Other Components

The compositions may additionally comprise small amounts of optional materials including additives for use in polymeric materials. Examples of suitable additives include, without limitation, plasticizers, stabilizers including viscosity stabilizers and hydrolytic stabilizers, primary and secondary antioxidants such as for example IRGANOX 1010, ultraviolet ray absorbers and stabilizers, anti-static agents, dyes, pigments or other coloring agents, fire-retardants, lubricants, processing aids, slip additives, release agents, and/or mixtures thereof. Additional optional additives may include acid copolymer waxes, such as for example Honeywell wax AC540; $TiO_2$, which is used as a whitening agent; optical brighteners; surfactants; and other components known in the art of golf ball manufacture to be useful but may not be critical to golf ball performance and/or acceptance. Many such additives are described in the *Kirk Othme Encyclopedia of Chemical Technology*, $5^{th}$ edition, John Wiley & Sons (Hoboken, 2005).

These additives may be present in the compositions in quantities that may be from 0.01 to 15%, preferably from 0.01 to 10%, or from 0.01 to 5% of the total composition, so long as they do not detract from the basic and novel characteristics of the composition and do not significantly adversely affect the performance of the composition or golf ball prepared from the composition, particularly high stiffness and high resilience.

The optional incorporation of such conventional ingredients into the compositions may be carried out by any known process, for example, by dry blending, by extruding a mixture of the various constituents, by the conventional masterbatch technique, or the like.

The compositions described herein may be injection molded or compression molded into various shaped articles, including covers, cores or intermediate layers for golf balls as described below.

Golf Ball Construction

The silica-filled composition described herein may be used with any type of ball construction. It may be used in the core, cover, or one or more intermediate layers of a golf ball. It is particularly useful for preparing golf balls with mantles or intermediate layers comprising the composition, providing such layers with excellent stiffness with little penalty in resilience.

Suitable golf ball constructions, including one-piece golf balls, two-piece golf balls, three-piece golf balls and multi-piece golf balls, are described in US2009/0118040 and in the references cited therein. The silica-filled composition described herein may be used in any of the golf balls in which the compositions described in these applications can be used. Of note, however, are golf balls comprising a cover prepared from a polyurethane or polyurea composition, and a core or intermediate layer prepared from the silica-filled composition as described herein; golf balls comprising a cover prepared from an ionomer composition other than the silica-filled composition, including an organic acid modified ionomer composition, and a core or intermediate layer prepared from the silica-filled composition as described herein; two-piece golf balls comprising a cover prepared from a polyurethane or polyurea composition and a core prepared from the silica-filled composition as described herein; two-piece golf balls comprising a cover prepared from an ionomer composition other than the filled composition as described herein, and a core prepared from the filled composition as described herein; two-piece balls comprising a cover comprising the silica-filled composition described herein and a core comprising rubber or an organic acid modified ionomer composition; wound golf balls having a cover comprising or prepared from a polyurethane or polyurea composition, and a core or intermediate layer prepared from the composition as described herein; wound golf balls having a cover comprising an ionomer or prepared from an ionomer composition, and a core or intermediate layer prepared from the composition as described herein.

Also noted are multi-piece golf balls having:

1. a core made of any composition (including thermoset compositions such as polybutadiene rubber), with or without filler, with an intermediate layer comprising the filled composition as described herein;

2. a cover prepared from a polyurethane composition, and a core made of any composition, and at least one additional intermediate layer prepared from the filled composition as described herein; and 3. a cover prepared from an ionomer composition, and a core made of any composition, and at least one additional intermediate layer prepared from the filled composition as described herein.

Furthermore, properties such as hardness, modulus, compression, resilience, core diameter, intermediate layer thickness and cover thickness of golf balls have been found to affect play characteristics such as spin, initial velocity and feel of golf balls. Depending on the construction and desired characteristics of the golf ball, the core, intermediate layers, and cover may have different resilience, compression or hardness to achieve desired performance characteristics. The compositions described herein may be useful in preparing golf balls with resilience, compression or hardness gradients within a golf ball. The selection of materials for performance based on these criteria is also described at length in US2009/0118040 and US2009/0325733 and in the references cited therein.

In particular, the golf balls described herein are characterized by a high initial velocity and a high COR. Coefficient of restitution ($COR_{125}$) may be measured by firing a sphere that is 1.50 to 1.68 inches in diameter at an initial velocity of 125 feet/second against a steel plate positioned 3 feet from the point where initial velocity is determined and dividing the velocity of rebound from the plate by the initial velocity. One may also measure COR at several initial velocities, develop a correlation and determine a COR at a specified initial velocity based on the correlation. COR may be determined on a sphere prepared from a single composition or a sphere having two or more layers (for example, a finished golf ball). One skilled in the art recognizes that COR cannot be greater than 1.0.

The compositions described herein are highly resilient, that is, they exhibit high COR values. Compositions described herein, containing silica filler, have $COR_{125}$ of greater than about 0.78, for example from about 0.79 to about 0.86 or about 0.83 to about 0.86.

For a solid test sphere prepared from a single composition, the COR may depend on a variety of characteristics of the composition, including its hardness. Often it is the case with ionomers that harder resins exhibit higher COR values. However when a resin is modified with a filler, generally the hardness increases and COR decreases. In a two-piece solid golf ball with a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

Generally for homologous series of filled polymers there is a correlation between COR and methods to measure modulus such as flex modulus and Atti compression. However in the case of fumed or precipitated silica, the Atti compression values are greater than for alternative fillers in the same resin. Without being bound by theory, the polymer matrix with fumed or precipitated silica filler with good oil absorption may respond to high speed tests such as Atti compression and COR in a different fashion than other polymer/filler composites.

Moreover, the compositions described herein have a Shore D hardness of at least about 30, such as about 40 to 60, as measured on a formed sphere. In addition, the compositions described herein preferably have a flexural modulus of about 15 ksi to about 80 ksi, preferably 20 to about 50.

The thermoplastic compositions described herein may be useful in a wide range of objects other than covers, mantles, intermediate layers, cores, and centers of golf balls. The compositions may be used as cores for balls other than golf balls.

The compositions also may be useful in other sporting equipment applications, particularly in golf shoe cleats, components of golf clubs such as golf club face plates or inserts, molded golf club heads, club head coatings or casings, and fillers for inner cavity of a golf club head, and the like. The compositions may be used in place of materials taught in the art for use in club faces, such as poly-imides reinforced with fillers or fibers, methyl (meth)acrylate copolymers, carbon-fiber reinforced polycarbonate, materials based on PMMA and crosslinkable monomers, and cross-linked synthetic rubber. The composition may also be substituted for the cured acrylic monomer, oligomer, polymer used to impregnate wood club heads, for rubber-like elastic cores in club heads, and for molded polyurethane club heads. As such, golf club heads may be prepared having a front striking face adapted to strike a ball and an insert mounted on the striking face, said insert comprising a molded article comprising the composition above. In addition, golf club heads comprising a metal body and an insert plate secured to the forward striking surface of the metal body and made of the composition above laminated with an outer metal layer formed with grooves. In addition, this invention also includes a golf club having a shaft with a club head affixed to the shaft, wherein the club head is described above, having a component comprising the composition above.

The composition may also be useful for preparing molded articles that are footwear structural components, provide shape support for footwear construction, such as heel counters, toe puffs, soles and cleats. "Heel counter" as used herein refers to a stiff, curved piece that provides shape and structure to the heel area of a shoe. "Toe puff" or "toe box" as used herein refers to a stiff, arched piece that provides shape and structure to the toe area of a shoe. "Sole" as used herein refers to a stiff, generally flat piece that provides shape and structure to the bottom of a shoe. These structural components may be incorporated into the internal structure of the shoe and covered with additional components for wear and/or appearance.

The composition described herein may also be useful in non-sporting good applications such as caulking materials, sealants, modifiers for cement and asphalt, and coatings. The compositions may also be useful in toys, decorative objects, and containers for inert materials.

The following examples are provided to describe the invention in further detail. These examples, which set forth a preferred mode presently contemplated for carrying out the invention, are intended to illustrate and not to limit the invention.

EXAMPLES

Materials Used
EAC-3: An ethylene/AA/nBA terpolymer with 10.5% of AA and 15.5% of nBA, with an MI of 60.
EAC-5: An ethylene/acrylic acid/nBA terpolymer with 6.2% of AA and 28.0% of nBA, with an MI of 300.
EAC-10: An ethylene/AA/nBA terpolymer with 8.5% of AA and 15.5% of nBA, with an MI of 60.
MB-1: A $Mg(OH)_2$ concentrate with 49% $Mg(OH)_2$ in EAC-5.
Oleic acid: a commercial grade material obtained from Chemtura Industries of Middlebury, Conn., under the tradename INDUSTRENE 106.
Stearic acid: a commercial grade.
Composition 1: a composition comprising 65% of EAC-3 and 35 weight % oleic acid, wherein 94-100% of the total carboxylic acid groups were neutralized to carboxylate salts with Mg cations by treatment with MB-1 in an extruder.

Composition 2: a composition comprising 62% of EAC-10 and 38 weight % stearic acid, wherein 94-100% of the carboxylic acid groups were neutralized to carboxylate salts with Mg cations by treatment with $Mg(OH)_2$, to provide a final MI of 0.7 g/10 min.

F-1: 4000 Angstrom glass spheres (25μ) available under the tradename SPHERIGLASS® from Potters Industries, Inc., Valley Forge, Pa.

F-2: Barium Sulfate (1μ) available under the tradename CIMBAR® EX from Cimbar Performance Minerals, Cartersville, Ga.

F-3: Barium Sulfate (<45μ) available under the tradename POLYWATE® 325 from Cimbar Performance Minerals.

F-4: Calcium Carbonate (0.7μ) available under the tradename ALBAFIL® from Specialty Minerals, Inc., Adams, Mass.

F-5: Talc, Magnesium Silicate Hydroxide, platy, (2.5μ) available under the designation "9102" from Specialty Minerals, Inc.

F-6: Wollastonite, calcium metasilicate, acicular morphology with 11:1 L/D, (4.5μ) available under the tradename NYGLOSS® 4W-10012 from NYCO Minerals, Inc., Willsboro, N.Y.

F-7: Untreated Fumed Silica available under the tradename CAB-O-SIL® EH5 from Cabot Corporation, Billerica, Mass. and had a B.E.T. surface area of 380 $m^2/g$, tamped density of 50 g/L, oil adsorption of about 300-350 g oil/100 g silica using a spatula rub-out test, 4% aqueous slurry pH of 3.7-4.3, and average particle (aggregate) length of 0.2-0.3 microns.

F-8: TECO SIL 44CS electrically fused silica (5-9μ) available from C-E Minerals, King of Prussia, PA and had a surface area of 1.1-1.7 $m^2/g$.

F-9: MINUSIL 15 fine ground silica (50 available from U.S. Silica Company, Berkeley Springs, W. Va. and had a bulk density-compacted of 47 lbs/ft³, median diameter of 5.0 microns, pH of 6.6, and oil absorption of 30 according to ASTM D-1483.

F-10: GASIL 200DF untreated silica gel available from PQ Corporation, Conshohocken, Pa. had a Malvern 100 mm lens average particle size of 4.3 microns, pore volume of 0.4 ml/g, 5% aqueous solution pH of 4.2, surface area of 750 $m^2/g$, and linseed oil absorption of 80 g/100 g.

F-11: FLO-GARD® SP precipitated silica available from PPG Industries, Inc., Monroeville, Pa. and with DBP oil absorption of 265 mL/100 g (254 g oil/100 g silica), pH of 6.9, and typical median particle size of 36 microns by laser diffraction. This material is reported to have surface area of 210 $m^2/g$ in WO2005/000442.

General extrusion conditions for making the blends identified in Table 2 are shown in Table 1. Composition 1 was processed with various fillers to prepare compositions summarized in Table 2. A Werner and Pfleiderer (Ramsey, N.J.) ZSK-30 co-rotating twin screw extruder with 13 barrels and 12 heated zones equipped with a high work screw was utilized to process these blends. Polymer pellets and fillers were fed from feeders at the rear of the extruder, except in the case of fumed silica (F-7) and precipitated silica (F-11) which, because of their low bulk density, were fed through side stuffers located at barrels 5 and 9.

TABLE 1

|  | Zone 1 | Zone 2 | Zones 3-13 | Die | Melt |
|---|---|---|---|---|---|
| Temperature ° C. | 65-77 | 123-153 | 177-209 | 189-204 | 216-226 |
| Vacuum inches | 27-28 | Screw Speed rpm | 150 | Total rate (lb/h) | 18-21 |

Most of the compositions were formulated to provide a volume fraction of filler of about 0.06 (as summarized in Table 3), but some compositions had higher or lower volume fractions of filler.

TABLE 2

| | Composition 1 | F-1 | F-2 | F-3 | F-4 | F-5 | F-6 | F-7 | F-8 | F-9 | F-10 | F-11 |
|---|---|---|---|---|---|---|---|---|---|---|---|---|
| | | \multicolumn{11}{c}{Filler density (g/cc)} | | | | | | | | | | |
| Example | | 2.5 | 4.4 | 4.2 | 2.7 | 2.8 | 2.9 | 2.2 | 2.2 | 2.65 | 2.1 | 1.9-2.1 |
| | | \multicolumn{11}{c}{Parts by weight} | | | | | | | | | | |
| Comparative Example C1 | 100 | | | | | | | | | | | |
| Comparative Example C2 | 85.8 | 14.2 | | | | | | | | | | |
| Comparative Example C3 | 78.5 | | 21.5 | | | | | | | | | |
| Comparative Example C4 | 78.2 | | | 21.8 | | | | | | | | |
| Comparative Example C5 | 68.9 | | | 31.1 | | | | | | | | |
| Comparative Example C6 | 84.8 | | | | 15.2 | | | | | | | |
| Comparative Example C7 | 84.3 | | | | | 15.7 | | | | | | |
| Comparative Example C8 | 74.4 | | | | | 25.6 | | | | | | |
| Comparative Example C9 | 83.9 | | | | | | 16.1 | | | | | |
| Example 1 | 95.5 | | | | | | | 4.5 | | | | |
| Example 2 | 84.9 | | | | | | | 15.1 | | | | |
| Comparative Example C10 | 95.5 | | | | | | | | 4.6 | | | |
| Comparative Example C11 | 84.9 | | | | | | | | 15.1 | | | |
| Comparative Example C12 | 94.6 | | | | | | | | | 5.4 | | |
| Comparative Example C13 | 82.4 | | | | | | | | | 17.6 | | |
| Comparative Example C14 | 95.5 | | | | | | | | | | 4.6 | |
| Comparative Example C15 | 84.9 | | | | | | | | | | 15.1 | |
| Example 3 | 95.5 | | | | | | | | | | | 4.6 |
| Example 4 | 84.9 | | | | | | | | | | | 15.1 |

The compositions were characterized for melt index and melting point and change in enthalpy using differential scanning calorimetry as summarized in Table 3. As used in the Examples below, Melt Index (MI) refers to melt index as determined according to ASTM D1238 at 190° C. using a 2160 g weight, with values of MI reported in g/10 minutes.

TABLE 3

| Example | Volume fraction of filler | Melt Index | DSC Tm (° C.) | ΔH (J/g) |
|---|---|---|---|---|
| Comparative Example C1 | 0 | 0.88 | 61 | 14 |
| Comparative Example C2 | 0.060 | 0.64 | 62 | 10 |
| Comparative Example C3 | 0.057 | 0.87 | 62 | 9 |
| Comparative Example C4 | 0.060 | 0.95 | 62 | 11 |
| Comparative Example C5 | 0.094 | 1.03 | 61 | 10 |
| Comparative Example C6 | 0.060 | 0.72 | 61 | 13 |
| Comparative Example C7 | 0.060 | 0.64 | 62 | 13 |
| Comparative Example C8 | 0.106 | 0.53 | 62 | 10 |
| Comparative Example C9 | 0.060 | 0.64 | 62 | 12 |
| Example 1 | 0.020 | 0.7 | 61 | 12 |
| Example 2 | 0.072 | 0.17 | 60 | 13 |
| Comparative Example C10 | 0.020 | 0.85 | — | — |
| Comparative Example C11 | 0.072 | 0.74 | — | — |
| Comparative Example C12 | 0.020 | 1.1 | — | — |
| Comparative Example C13 | 0.072 | 0.97 | — | — |
| Comparative Example C14 | 0.020 | 1.1 | — | — |
| Comparative Example C15 | 0.072 | 0.80 | — | — |
| Example 3 | 0.022 | 0.72 | — | — |
| Example 4 | 0.079 | 0.28 | — | — |

The compositions were molded into standard tensile dogbone plaques and tested for stress and elongation at break according to ASTM D638. Flex Modulus was measured according to ASTM D790, Method 1, Procedure A, employing a 3-point test fixture with a 2-inch span length and a crosshead speed of 0.50 inches/minute on standard flex bars. The method provides a measurement of the Tangent Modulus of Elasticity (3-Point Flex Modulus). The results are summarized in Table 4.

TABLE 4

| Example | Stress at Break (ksi) | Elongation at Break (%) | Flex Modulus (ksi) |
|---|---|---|---|
| Comparative Example C1 | 1.7 | 61 | 16.2 |
| Comparative Example C2 | 1.8 | 53 | 20.7 |
| Comparative Example C3 | 1.9 | 70 | 19.8 |
| Comparative Example C4 | 1.8 | 67 | 20.2 |
| Comparative Example C5 | 1.8 | 63 | 22.2 |
| Comparative Example C6 | 1.8 | 69 | 20.6 |
| Comparative Example C7 | 1.9 | 98 | 32.1 |
| Comparative Example C8 | 2.0 | 89 | 44.4 |
| Comparative Example C9 | 1.8 | 78 | 26.3 |
| Example 1 | 1.8 | 70 | 15.0 |
| Example 2 | 2.1 | 58 | 19.3 |
| Comparative Example C10 | 2.0 | 54 | 15.3 |
| Comparative Example C11 | 2.1 | 56 | 18.6 |
| Comparative Example C12 | 1.9 | 76 | 14.6 |
| Comparative Example C13 | 2.1 | 69 | 17.5 |
| Comparative Example C14 | 2.0 | 81 | 14.8 |
| Comparative Example C15 | 2.3 | 68 | 18.9 |
| Example 3 | 2.0 | 72 | 15.2 |
| Example 4 | 2.2 | 46 | 20.5 |

Thermoplastic Spheres The compositions were molded into spheres 1.53 to 1.55 inches in diameter. For example but not limitation, injection molding conditions may include temperatures, pressures and cycle times as indicated in Table 5.

TABLE 5

| | Temp (° C.) | Injection Pressure (mPa) | Cycle Times (sec) |
|---|---|---|---|
| Melt | 160-260 | Packing 25-180 | Filling and Packing 40-90 |
| Mold Front/Back | 10-30 | Hold 5-15 | Hold 15-30 Cooling Time 50-100 Screw Retraction 5-50 |

The spheres were measured for average diameter and specific gravity, and tested for hardness. Three balls of each composition were weighed once and measured for diameter and specific gravity three times each. The averages are reported in Table 6.

As used herein, "Shore D hardness" of a material is measured generally in accordance with ASTM D-2240, with a one-second delay, either on a plaque or on the curved surface of a molded sphere, four weeks after molding. The average hardness of three spheres of each composition is reported in Table 6.

TABLE 6

| Example | Diameter (inch) | Specific Gravity (g/cc) calculated | Specific Gravity (g/cc) measured | Hardness, Shore D |
|---|---|---|---|---|
| Comparative Example C1 | 1.541 | NA | 0.965 | 46 |
| Comparative Example C2 | 1.544 | 1.057 | 1.051 | 47 |
| Comparative Example C3 | 1.544 | 1.16 | 1.145 | 47 |
| Comparative Example C4 | 1.544 | 1.16 | 1.159 | 46 |
| Comparative Example C5 | 1.545 | 1.269 | 1.263 | 47 |
| Comparative Example C6 | 1.542 | 1.069 | 1.087 | 46 |

TABLE 6-continued

| Example | Diameter (inch) | Specific Gravity (g/cc) calculated | Specific Gravity (g/cc) measured | Hardness, Shore D |
|---|---|---|---|---|
| Comparative Example C7 | 1.549 | 1.076 | 1.067 | 48 |
| Comparative Example C8 | 1.555 | 1.16 | 1.132 | 49 |
| Comparative Example C9 | 1.545 | 1.081 | 1.072 | 46 |
| Example 1 | 1.538 | 0.990 | 0.996 | 47 |
| Example 2 | 1.533 | 1.054 | 1.054 | 51 |
| Comparative Example C10 | 1.546 | 0.990 | 0.985 | 50 |
| Comparative Example C11 | 1.548 | 1.054 | 1.047 | 51 |
| Comparative Example C12 | 1.546 | 0.999 | 0.992 | 49 |
| Comparative Example C13 | 1.548 | 1.087 | 1.073 | 50 |
| Comparative Example C14 | 1.547 | 0.989 | 0.977 | 49 |
| Comparative Example C15 | 1.548 | 1.051 | 1.030 | 53 |
| Example 3 | 1.542 | 0.988 | 0.980 | 49 |
| Example 4 | 1.546 | 1.047 | 1.037 | 54 |

Three spheres of each composition were tested for Atti (PGA) Compression. Atti Compression was measured using an "Atti" testing device according to standard procedures for that instrument. For accurate comparison of compression data, the diameter of the balls was corrected to 1.68 inch diameter using accepted methods, such as shimming. The results are summarized in Table 7 as an average.

COR was measured by firing the injection-molded spheres out of an air cannon at several velocities over a range of roughly 100 to 180 ft/sec. The spheres struck a steel plate positioned three feet away from the point where initial velocity was determined, and rebounded through a speed-monitoring device located at the same point as the initial velocity measurement. The COR of each measurement was determined as the ratio of rebound velocity to initial velocity. The individually determined COR measurements were plotted as a function of initial velocity. COR at a given speed (e.g. $COR_{125}$ at 125 ft/sec) was determined by linear regression. In some cases COR measurements were made directly at 125 and 180 ft/sec (±4 ft/sec), with minor corrections to the COR data made for deviations from the target speed using accepted methods. The results are summarized in Table 7 where the PGA compression was corrected to 1.68 inches.

TABLE 7

| Example | Atti (PGA) Compression | COR at 125 ft/sec | COR at 180 ft/sec |
|---|---|---|---|
| Comparative Example C1 | 95 | 0.859 | 0.796 |
| Comparative Example C2 | 103 | 0.839 | 0.768 |
| Comparative Example C3 | 103 | 0.834 | 0.763 |
| Comparative Example C4 | 105 | 0.829 | 0.755 |
| Comparative Example C5 | 110 | 0.810 | 0.730 |
| Comparative Example C6 | 108 | 0.826 | 0.755 |
| Comparative Example C7 | 115 | 0.796 | 0.723 |
| Comparative Example C8 | 124 | 0.754 | 0.675 |
| Comparative Example C9 | 108 | 0.820 | 0.747 |
| Example 1 | 104 | 0.851 | 0.788 |
| Example 2 | 121 | 0.833 | 0.771 |
| Comparative Example C10 | 100 | 0.848 | 0.787 |
| Comparative Example C11 | 107 | 0.828 | 0.761 |
| Comparative Example C12 | 97 | 0.853 | 0.787 |
| Comparative Example C13 | 105 | 0.832 | 0.763 |
| Comparative Example C14 | 98 | 0.854 | 0.789 |
| Comparative Example C15 | 111 | 0.830 | 0.764 |
| Example 3 | 101 | 0.856 | 0.793 |
| Example 4 | 116 | 0.840 | 0.780 |

Referring to FIG. 1, the Atti compression versus COR at 125 ft/sec for the unfilled and filled compositions was plotted. In FIG. 1, the unfilled composition (Comparative Example C1) is indicated by an open circle, compositions filled with fumed silica or precipitated are indicated with open triangles (Examples 1-4), and compositions containing other fillers (Comparative Examples C2-C15) are indicated by open squares. Visual inspection of the plot in FIG. 1 indicated that Examples 1 and 2 with fumed silica filler (F-7) and Examples 3 and 4 with precipitated silica (F-11) appeared to not group with the other filled compositions. Surprisingly, the Atti compression was significantly higher than would be expected from the other filled compositions. This observation was tested statistically by linear regression analysis, summarized in Table 8. Line A in FIG. 1 (the line equation is provided in Table 8) is the best-fit line determined by linear regression for Atti compression (Comp) and COR at 125 ft/sec ($COR_{125}$) for all fillers (F-1 through F-11). It showed a poor fit for a linear relationship, as indicated by the low $R^2$ reported in Table 8. Line B in FIG. 1 (the line equation is provided in Table 8) is the best fit line for compositions with conventional fillers F-1 to F-6 and F-8 to F-10. It showed a linear relationship between Atti compression and $COR_{125}$, with a very good fit as indicated by a high $R^2$. Line C in FIG. 1 (the line equation is provided in Table 8) is the best fit line for F-7 and F-11 filled compositions and unfilled Comparative Example C1 also showed an excellent linear fit as indicated by a very high $R^2$. Comparison of the $R^2$ for each of the lines A, B and C indicates that compositions filled with fumed or precipitated silica are statistically different than compositions filled with other fillers.

TABLE 8

| Examples | Fillers | Line | $R^2$ |
|---|---|---|---|
| All Data | F-1 through F-11 | Line A<br>Comp = −244.61$COR_{125}$ + 310.20 | 0.5912 |
| Comparative Examples C1-C15 | F-1 through F-6 and F-8, F-9 and F-10 | Line B<br>Comp = −272.68$COR_{125}$ + 331.56 | 0.9309 |
| Examples 1-4 and Comparative Example C1 (unfilled) | F-7 and F-11 | Line C<br>Comp = −974.73$COR_{125}$ + 933.78 | 0.9860 |

Only fumed silica filler (F-7) and precipitated silica filler (F-11) provided a combination of compression increase with significantly less COR decrease. These fillers had oil absorption greater than 100 g oil/100 g silica. Glass spheres as filler (F-1) had a COR reduction similar to fumed or precipitated silica, but with much lower compression increase. Talc filler (F-5) had good compression increase, but the COR dropped dramatically. Silica gel with low oil absorption (F-10) behaved similarly to the other comparative fillers.

Additional fumed silica-filled compositions were prepared, molded into test plaques and neat nominal 1.55 inch spheres, and tested for properties as described above. The compositions were overmolded over ionomer cores with nominal diameter of 3.94 cm (1.55 inches) and weight of 36.3 g, prepared from Composition 1 and barium sulfate to provide 2-piece balls with the example compositions as the cover. The compositions and properties are summarized in Table 9.

TABLE 9

|  | Example 5 | Example 6 | Example 7 |
|---|---|---|---|
|  | Parts by weight | | |
| Composition 2 | 100 | 95.45 | 84.9 |
| F-7 |  | 4.55 | 15.1 |
| Measured MI | 0.86 | 0.74 | 0.3 |
| Tensile tests on tensile 'dogbones' | | | |
| Peak Stress (ksi) | 2.2 | 2.2 | 2.5 |
| Elongation at Break (%) | 48% | 49% | 51% |
| Break Stress (kpsi) | 2.1 | 2.2 | 2.3 |
| Flex Modulus (ksi) on flex bars | 33.7 | 39.0 | 48.2 |
| Hardness, Shore D on plaques | 48.0 | 49.9 | 54.4 |
| Neat Sphere Properties | | | |
| Specific Gravity, g/cc | 0.950 | 0.977 | 1.034 |
| Hardness, Shore D on spheres | 53 | 54 | 57 |
| Atti Compression | 110 | 116 | 131 |
| COR (by linear regression) | | | |
| 125 ft/sec | 0.827 | 0.820 | 0.798 |
| 180 ft/sec | 0.774 | 0.766 | 0.746 |
| 2-Piece Ball Properties | | | |
| Specific Gravity, g/cc | 1.095 | 1.100 | 1.107 |
| Atti Compression as measured | 111 | 114 | 114 |
| COR (by linear regression) | | | |
| 125 ft/sec | 0.833 | 0.833 | 0.833 |
| 180 ft/sec | 0.766 | 0.766 | 0.767 |

Plotting Atti compression (Comp) and COR at 125 ft/sec ($COR_{125}$) for neat spheres of these compositions according to linear regression showed an excellent linear fit, expressed by Comp=−713.97 $COR_{125}$+700.89, with $R^2$=0.9977.

For 2-piece balls, the COR and compression are dominated by the properties of the core. Decreasing cover COR decreases the overall ball COR, while increasing cover compression increases the overall ball COR. In the case of the 2-piece balls summarized in Table 9, these factors appear to have cancelled out, and the resulting balls have similar properties, despite different cover compositions.

The compositions used in Examples 5 through 7 were also overmolded over nominal 1.55 inch commercial thermoset polybutadiene rubber cores to provide two-piece balls with a nominal diameter of 1.68 inches. These balls were tested for impact durability (Table 10). Impact Durability is the average number of hits to failure (crack in the cover) of balls fired by an air cannon of a COR tester at 135 ft/sec which impact a flat metal plate at a perpendicular angle.

TABLE 10

|  | Example 5 | Example 6 | Example 7 |
|---|---|---|---|
| Impact Durability Hits to failure at 135 ft/sec | 171 | 174 | 56 |

The invention claimed is:

1. A filled thermoplastic composition comprising an organic acid-modified ionomer and a silica filler wherein
   the organic acid-modified ionomer comprises or is produced from an ethylene acid copolymer and an organic acid or salt thereof;
   the ethylene acid copolymer comprises copolymerized units of ethylene, copolymerized units of a $C_{3-8}$ α,β-ethylenically unsaturated carboxylic acid, and optionally copolymerized units of a softening comonomer selected from the group consisting of vinyl acetate, alkyl acrylate and alkyl methacrylate;
   the organic acid comprises at least one aliphatic, monofunctional organic acid having 4 to 36 carbon atoms;
   the combined acid moieties in the acid copolymer and the organic acid are nominally neutralized to a level from about 70% to about 100%; and
   the silica filler has an oil absorption greater than 250 g oil/100 g silica, as determined according to ASTM D1483-95.

2. The composition of claim 1 wherein the carboxylic acid is acrylic acid or methacrylic acid and the softening comonomer is alkyl acrylate and is present in an amount from 3 to 45% of the acid copolymer.

3. The composition of claim 2 wherein the carboxylic acid is present in an amount from 5 to 20% of the copolymer and softening comonomer is present in an amount from 10 to 45% of the acid copolymer.

4. The composition of claim 3 wherein the silica filler consists essentially of fumed silica, precipitated silica or silica gel.

5. The composition of claim 1 wherein the acid copolymer is a dipolymer of ethylene and acrylic acid or methacrylic acid.

6. The composition of claim 1 wherein the organic acid or salt thereof is present in about 5 to about 60% of the organic acid-modified ionomer.

7. The composition of claim 1 wherein the silica filler consists essentially of fumed silica or precipitated silica.

8. The composition of claim 7 wherein the silica filler is present in the composition in an amount from about 1 to about 20%, based on the weight the composition.

9. The composition of claim 8 wherein the silica filler is present in the composition in an amount from about 3 to about 17%, based on the total weight of the composition.

10. The composition of claim 1 wherein the overall salt of the composition comprises at least about 75 equivalent % magnesium cations or calcium cations.

11. An article comprising or produced from the filled thermoplastic composition of claim 1.

12. The composition of claim 1 wherein the silica filler has a surface area greater than 100 m²/g, measured according to ASTM D1993-03.

13. The article of claim 11 that is a multilayer structure wherein the filled thermoplastic composition is a layer of the multilayer structure.

14. The article of claim 11 wherein the article is film, sheet, sphere, or molded article.

15. The article of claim 11 wherein the article is a golf ball comprising a core and a cover and at least one intermediate layer positioned between the core and the cover, wherein the intermediate layer comprises the filled thermoplastic composition.

16. The article of claim 15 wherein the cover comprises a polyurethane composition, a polyurea composition, or an ionomer composition other than the filled thermoplastic composition.

17. The article of claim 15 wherein the cover comprises the filled thermoplastic composition.

18. The article of claim 15 wherein the core comprises polybutadiene rubber.

19. The article of claim 15 wherein the core comprises an organic acid-modified ionomer composition other than the filled thermoplastic composition.

20. The article of claim 11 wherein the article is a component of a golf club or a footwear structural component; the component of a golf club is a golf club face plate or insert, molded golf club head, club head coated with the composition, and a golf club head filled with the composition; and the footwear structural component is a heel counter, toe puff, sole, or cleat.

* * * * *